Jan. 9, 1968    J. SPERLICH    3,363,064
MATRIX MEANS CIRCUIT TESTER
Filed Feb. 8, 1965    2 Sheets-Sheet 1

INVENTOR
Josef Sperlich
BY *Spencer & Kaye*
ATTORNEYS

Jan. 9, 1968  J. SPERLICH  3,363,064

MATRIX MEANS CIRCUIT TESTER

Filed Feb. 8, 1965  2 Sheets-Sheet 2

INVENTOR
Josef Sperlich

BY *Spencer & Kaye*

ATTORNEYS

United States Patent Office 3,363,064
Patented Jan. 9, 1968

3,363,064
MATRIX MEANS CIRCUIT TESTER
Josef Sperlich, Backnang, Wurttemberg, Germany, assignor to Telefunken Patentverwertungs G.m.b.H., Ulm (Danube), Germany
Filed Feb. 8, 1965, Ser. No. 431,067
Claims priority, application Germany, Feb. 29, 1964,
T 25,728
14 Claims. (Cl. 179—18)

The present invention relates to a circuit arrangement for testing switching circuits and/or lines, which are arranged in matrix form, to determine whether the circuits or lines are free or in use; more particularly, the invention relates to such an arrangement for use in telecommunication systems, particularly telephone exchange systems.

Switching circuits or lines which are needed for building up a connection have to be continuously supervised with regard to their status, to determine whether they are free or in use. In telephone systems in which connections are built up by means of electromagnetic relays, the requisite supervision is carried out by means of relays which are connected in parallel or in series with the devices to be tested. In exchanges which employ electronic devices, however, such test relays are too slow in comparison with the high speed of operation required and determination of the status of a switching circuit or of a line necessitates the use of electronically operating devices.

Circuits are known which permit a rapid determination of the instantaneous status of such circuits or lines by means of semiconductor devices, tubes or magnetic elements; the indicating criterion is then formed by voltages determined by the residual magnetism of a magnetic toroidal core, or the current flowing in the switching circuits or lines to be tested. In this case, the testing devices are generally electrically connected through fixed wiring to the switching circuits or lines to be tested, and thus load the current of voltage sources present in the systems with their internal resistance.

Furthermore, it is frequently required that such switching circuits or lines be tested in groups so as to avoid repeated use of the same line in succession in the event of a faulty line. On changing over to another group, the defective line is eliminated from further engagement; this is not the case if the selection operation is carried out in such a manner that, starting from a zero position, the outlets of switching circuits or lines are tested one after the other in a specific sequence.

Furthermore, for economic reasons, it is desirable not to use a separate test circuit for each switching circuit or line to be tested, because the costs of such a testing arrangement are determined predominantly by the costs of the test circuits. In addition, conventional devices also necessitate a connection between each of the switching circuits or lines to be tested and the test circuits through auxiliary lines, as a result of which the whole installation becomes more complicated and expensive.

It is therefore an object of the present invention to provide a circuit arrangement for testing switching circuits or lines, which is free from the above-mentioned drawbacks.

It is a further object of the present invention to provide a circuit arrangement for determining whether switching circuits or lines, which are arranged in matrix form, are free or in use, in which arrangement the test circuits are electrically separated from the switching circuits or lines to be tested.

These objects as well as others are achieved by the invention, in which a circuit arrangement is provided for testing switching elements (circuits or lines) arranged in matrix form, to determine whether they are free or engaged; the matrix is divided into partial matrices of equal size, any one of which may be selected for testing by switches forming a switching matrix, and a number of test circuits are provided in a test matrix equal to the number of elements to be tested in each partial matrix, so that selection of a given test circuit, in conjunction with the selection of a partial matrix by the switching matrix, uniquely determines an element to be tested.

Additional objects and advantages of the present invention will become apparent upon consideration of the following description when taken in conjunction with the accompanying drawings in which.

Figure 1:
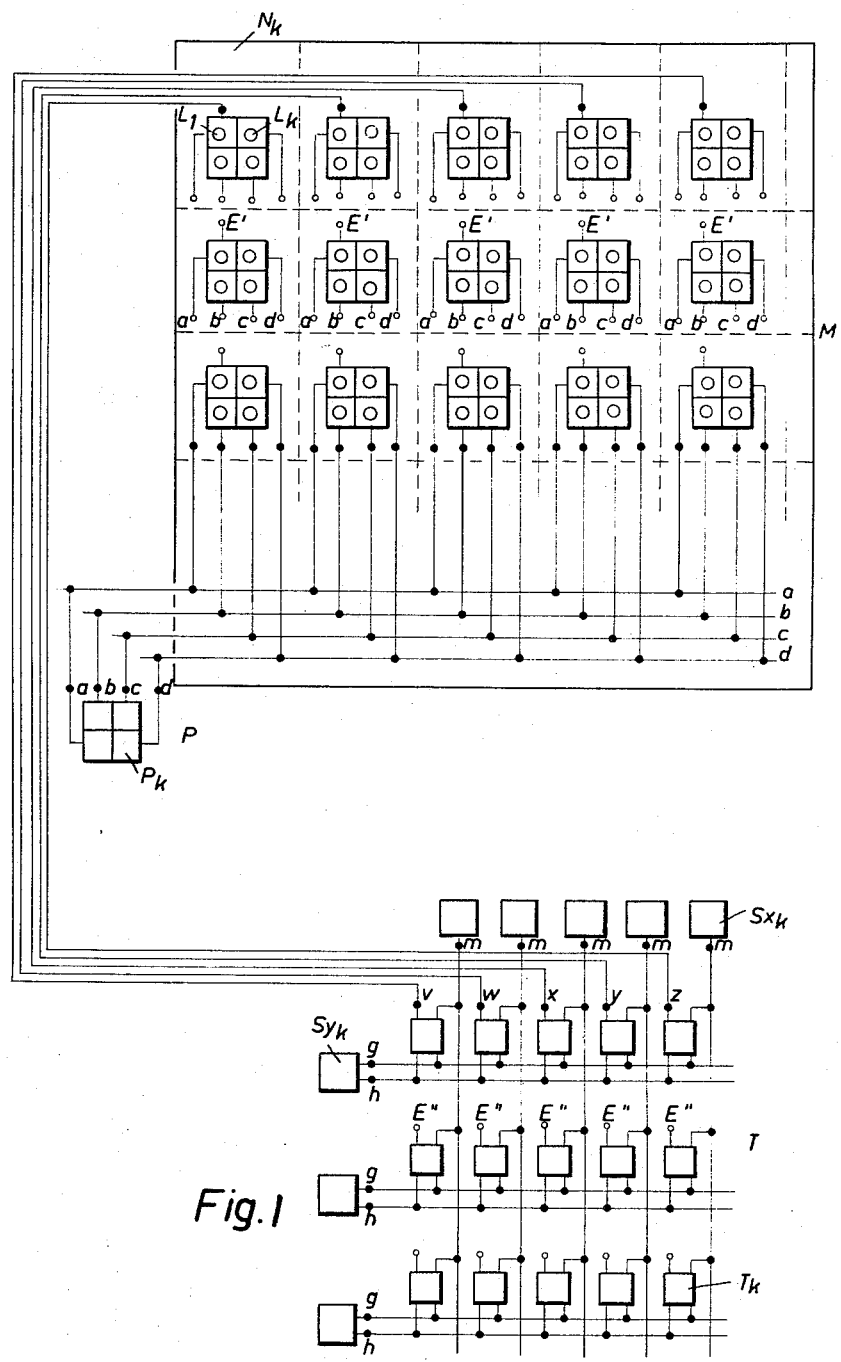
FIGURE 1 is a schematic showing the main matrix M which is divided into partial matrices $N_k$ which contain the switching elements which are to be tested, which are switching circuits or lines $L_k$, the test matrix P containing elements $P_k$, the selector switches $T_k$, which are combined to form a matrix T, and the switches $Sx_k$ and $Sy_k$.

Referring now to the drawings, FIGURE 1 shows the switching circuits or lines $L_k$ to be tested which are combined to form a matrix and partial matrices $N_k$, and the test matrix P which is formed of the individual test circuits $P_k$. All partial matrices $N_k$ are connected to the test matrix P through interrogation lines $a, b, c, d$, the number of which is equal to the number of switching elements $L_k$ combined in a partial matrix. Each switching element in each partial matrix $N_k$ is connected through one of the interrogation lines to an associated element $P_k$ in the test matrix P. As a result, it is no longer necessary to connect each of the switching elements to be tested separately to the test matrix, and many interrogation lines are saved. The size of a partial matrix according to the invention can be freely selected, provided only that the number of elements $L_k$ in the partial matrix coincides with that in the test matrix $P_k$.

The selection from matrix M of a partial matrix $N_k$ to be tested will be explained with reference to FIGURE 1. The desired partial matrix is selected via selection lines $v, w, x, y, z \ldots$, the total number of which is equal to the total number of partial matrices present, by means of selector switches $T_k$, which are similarly arranged in matrix form and which are controlled through switches $Sx_k$ and $Sy_k$. Thus the switches in the first row of the switching matrix T select partial matrices in the first row of matrix M, those in the second row select partial matrices in the second row of matrix M, and so on.

Figures 3, 4:
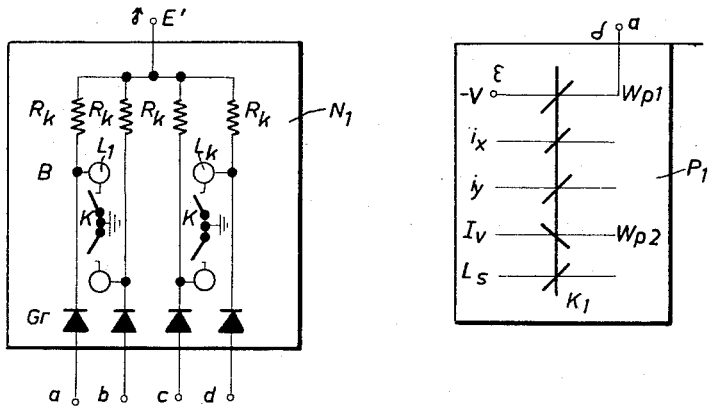
FIGURE 3 is a schematic showing the construction of a partial matrix $N_1$.
FIGURE 4 is a schematic of a test circuit $P_1$.
Figure 2:
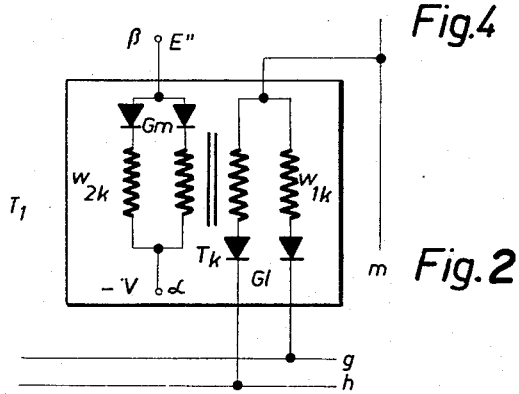
FIGURE 2 shows, in schematic, a selector switch $T_1$.

FIGURE 2 represents such a selector switch $T_1$. For the sake of clarity, only one primary winding of the transformer $T_k$ is shown, the center tap of which is connected to the column line $m$ and the two ends of which are connected through diodes G1 to the row lines $g$ and $h$ respectively, of the switching matrix T. The cathodes of diodes G1 are connected to the lines $g$ and $h$, respectively, and the anodes are connected to the ends of the primary windings $w_{1k}$. For greater reliability, a plurality of primary windings $w_{1k}$ may be arranged to form a matrix, which may be interrogated individually. The secondary winding $w_{2k}$ of the transformer $T_k$ likewise has a center tap which is connected to the supply voltage $-V$. The free ends of the secondary winding $w_{2k}$ are combined through diodes $Gm$, the cathodes of which are connected to respective winding ends at the point $E''$ which is connected through one of the lines $v, w, x, y, z \ldots$, to point $E'$ (FIGURE 3) of a partial matrix $N_k$. The points designated by $\alpha, \beta$, γ, σ, ε, in FIGURES 3, 4 and 2 thus represent a closed circuit through which no current flows in the normal condition. On the other hand, if a signal is applied to the primary side of transformer $T_k$, then a current flows in the above-mentioned circuit which activates the desired partial matrix $N_k$ and produces, by means of the premagnetizing winding $W_{p1}$, a flux in the toroidal core $K_1$ of FIGURE 4. In addition, the toroidal core $K_1$ has a second premagnetizing winding $W_{p2}$, which produces a flux twice as great and opposed in direction the flux due to the premagnetizing winding $W_{p1}$, so as to prevent the toroidal core $K_1$ from inducing a voltage in the read winding $L_s$ giving rise to disturbances when it is not fully controlled. The desired test circuit $P_k$ is selected by two-line coincidence, as shown in FIGURE 4, through the row wire $i_x$ and the column wire $i_y$, which are connected to row and column devices (not shown). The combined fluxes produced by the currents in these wires, when added to the flux generated by premagnetizing winding $W_{p1}$, are sufficient to overcome the flux due to $W_{p2}$ and cause $K_1$ to change state. Consequently, as a result of the selection of any partial matrix $N_k$ it is possible to interrogate individual switching elements in groups, thereby avoiding successive repeated interrogation of a line which is already blocked. In FIGURE 3, the switching circuit or line $L_k$ to be tested, the electrical condition of which is symbolized by the switch K, is connected at point B between resistors $R_k$ which serve to limit the current, and diodes $Gr$ which disconnect the test circuit from the switching element $L_k$ while the latter is engaged.

Figures 5, 6:
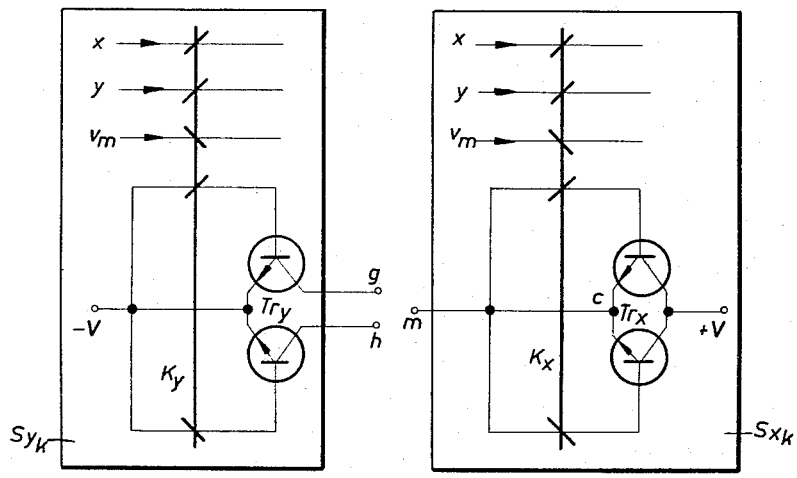
FIGURES 5 and 6 are schematics showing the switches $Sy_k$ and $Sx_k$.

The switch $T_k$ is controlled by switches $Sy_k$ and $Sx_k$, the construction of which is illustrated in FIGURES 5 and 6. The two pairs of transistors $Tr_x$ and $Tr_y$, which are operated in push-pull, are controlled by means of the toroidal cores $K_x$ and $K_y$, respectively, which have rectangular hysteresis curves. The two collectors of the pair of transistors $Tr_y$ are connected to auxiliary lines $g$ and $h$, respectively, and the emitters of the pair of transistors $Tr_x$, which are combined at point C, are connected to auxiliary line $m$.

In addition the toroidal cores $K_x$ and $K_y$ have premagnetizing windings $V_m$, which produce fluxes as great as to saturate the cores. The combined fluxes produced by selecting currents in the wires $x$ and $y$ are sufficient to overcome the fluxes due to $V_m$ and cause the cores $K_x$ and $K_y$ to change state.

In order to explain the operation of the circuit arrangement described above, it will now be assumed that switching circuit or line $L_1$ is in its engaged, or busy condition, in which it is grounded through switch K (FIGURE 3). Because of this, the circuit from the supply voltage $-V$ (FIGURE 4) through winding $W_{p1}$ of toroidal core $K_1$ and the switching circuit or line $L_1$, in which the cathode of diode $Gr$ is grounded through the switch K, is blocked in spite of the interrogation current generated by the primary winding $w_{1k}$ of transformer $T_k$; therefore, no current flows through premagnetizing winding $W_{p1}$. No free-line signal is produced in toroidal core $K_1$ as a result of signals applied through the row and column wires $i_x$ and $i_y$ because the flux through premagnetizing winding $W_{p1}$ is absent. At the end of the engaged condition, the switch K is disconnected from ground by a device, a description of which is not necessary to understand the present invention. Toroidal core $K_1$ generates a free-line signal when interrogated again; it is interrogated by generating a current in the primary winding $w_{1k}$ of transformer $T_k$. This current is a series of rectangular pulses, due to the push-pull operation of $Tr_x$ and $Tr_y$, which pulses are rectified by the secondary of transformer $T_k$ and added to the current resulting from the voltage $-V$. If the switching circuit or line $L_1$ is not engaged or busy, then a current flows through premagnetizing winding $W_{p1}$ of the toroidal core $K_1$, which, when interrogated, induces a free-line signal in the read winding $L_s$. This signal may be utilized to actuate any conventional indicator, through an amplifier, if necessary.

Neither an interruption nor a breakdown in the pairs of transistors or the diodes $Gm$ in the secondary winding $w_{2k}$ of transformer $T_k$ leads to a faulty call, with a circuit arrangement according to the invention; as a result, the reliability of the whole circuit arrangement is considerably increased. In addition, this circuit arrangement provides electrical separation of the test circuits from the switching circuits or lines to be tested.

It will be understood that the above description of the present invention is susceptible to various modifications, changes and adaptations, and the same are intended to be comprehended within the meaning and range of equivalents of the appended claims.

I claim:
1. A circuit arrangement for testing switching elements to determine their condition, said circuit arrangement comprising, in combination:
   a plurality of switching elements arranged in a matrix which is divided into partial matrices, each containing an equal plurality of such switching elements;
   a test matrix, including a plurality of test circuits equal in number to the number of switching elements in each partial matrix, each for testing the condition of a respective one of the switching elements in each said partial matrix; and
   switching matrix means for selecting one of said partial matrices to be tested.
2. A circuit arrangement as defined in claim 1, wherein each of said test circuits includes a magnetic element.
3. A circuit arrangement as defined in claim 2, wherein each said magnetic element is a toroidal core having a rectangular hysteresis loop, a premagnetizing winding provided on said toroidal core, and means connecting said premagnetizing winding to a respective one of said switching elements to be tested, said connecting means including a diode.
4. A circuit arrangement as defined in claim 3, including a further premagnetizing winding on said toroidal core for producing a flux twice as great as, and in the opposite direction from, the flux produced by said premagnetizing winding.
5. A circuit arrangement as defined in claim 3, wherein said test matrix is formed by rows and columns of said toroidal cores, said circuit arrangement including horizontal and vertical selection windings on each said magnetic core, and means connected to selected ones of said horizontal and vertical selection windings for selecting one of said cores to test its associated switching element.
6. A circuit arrangement as defined in claim 1, wherein each test circuit includes an interrogation line for interrogating its associated switching element in each of said partial matrices, said interrogation lines being electrically disconnected from the switching elements to be tested.
7. A circuit arrangement as defined in claim 6, wherein said switching matrix includes a number of switching circuits, equal to the number of partial matrices and arranged in rows and columns, said arrangement including:
   a plurality of selection lines, each connecting a switching circuit to a respective partial matrix, said selection lines and interrogation lines constituting control lines, the total number of control lines being equal to the sum of the number of test circuits in the test matrix and the number of partial matrices.
8. A circuit arrangement as defined in claim 7, including means for testing said switching elements successively by groups, said groups being constituted by said partial matrices.
9. A circuit arrangement as defined in claim 7, including means for testing individual switching elements selectively.

10. A circuit arrangement as defined in claim 1, wherein each switching circuit for selecting a partial matrix includes a transformer having a secondary winding.

11. A circuit arrangement as defined in claim 10, wherein each of said transformers includes at least one primary winding, said circuit arrangement including means for supplying said primary winding with control signals.

12. A circuit arrangement as defined in claim 10, wherein each of said transformers includes at least one primary winding, all primary windings being arranged to form a matrix, said circuit arrangement including means for supplying said primary windings with control signals individually.

13. A circuit arrangement as defined in claim 10, wherein a diode is provided in each interrogation line, and including means for biassing each diode to isolate its associated switching circuit from its associated testing circuit when the associated switching element is busy, and for biassing said diode to connect the associated switching circuit and testing circuit when said switching element is free.

14. A circuit arrangement as defined in claim 10, including a plurality of transistorized horizontal signal generators, each connected with the transformer primary windings in a respective row of said switching matrices, and a plurality of transistorized vertical signal generators, each connected with the transformer primary windings in a respective column of said switching matrix, each of said horizontal and vertical signal generators including a pair of transistors arranged in parallel, and means for operating said transistors in push-pull fashion, said means including a toroidal magnetic core having a rectangular hysteresis loop.

References Cited
UNITED STATES PATENTS

| | | | |
|---|---|---|---|
| 2,978,641 | 4/1961 | Voegtlen | 179—18 |
| 3,160,852 | 12/1964 | Simms | 179—18.74 |

KATHLEEN H. CLAFFY, *Primary Examiner.*

L. A. WRIGHT, *Assistant Examiner.*